(12) United States Patent
Yamaguchi et al.

(10) Patent No.: US 7,752,826 B2
(45) Date of Patent: Jul. 13, 2010

(54) PRODUCTION SYSTEM

(75) Inventors: Yasushi Yamaguchi, Ritto (JP); Kazumi Kitagawa, Ritto (JP); Yukio Nakagawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 11/279,571

(22) Filed: Apr. 13, 2006

(65) Prior Publication Data
US 2006/0231295 A1  Oct. 19, 2006

(30) Foreign Application Priority Data
Apr. 14, 2005 (JP) ............................. 2005-117258

(51) Int. Cl.
*B65B 1/32* (2006.01)
*B65B 3/28* (2006.01)
(52) U.S. Cl. .................. 53/55; 53/52; 53/54; 53/493; 53/502; 177/25.18
(58) Field of Classification Search .............. 53/55, 53/52, 54, 58, 493, 502; 177/25.18
See application file for complete search history.

(56) References Cited

U.S. PATENT DOCUMENTS

| | | | | |
|---|---|---|---|---|
| 4,010,594 A | * | 3/1977 | Boyd | 141/1 |
| 4,074,507 A | * | 2/1978 | Ruf et al. | 53/502 |
| 4,615,403 A | * | 10/1986 | Nakamura | 177/25.18 |
| 4,690,269 A | | 9/1987 | Takao | |
| 4,840,240 A | * | 6/1989 | Toyoda et al. | 177/25.18 |
| 6,096,983 A | * | 8/2000 | Ozaki et al. | 177/52 |
| 6,119,438 A | * | 9/2000 | Bacon et al. | 53/451 |
| 6,301,859 B1 | * | 10/2001 | Nakamura et al. | 53/373.7 |
| 6,365,846 B1 | * | 4/2002 | Kono et al. | 177/25.18 |
| 6,437,256 B1 | * | 8/2002 | Miyamoto | 177/25.18 |

(Continued)

FOREIGN PATENT DOCUMENTS

EP   0 342 825 A2   11/1989

(Continued)

OTHER PUBLICATIONS http://www.baggingtechnology.com/svmc_snack_high_speed_vffs_with_multichead_combination_weighers.htm, SVMC SNACK VFFS, "SVMC-SNACK Stiavelli Continous Motion Vertical Form Fill Seal machines for bagging various snack".*

*Primary Examiner*—Rinaldi I. Rada
*Assistant Examiner*—Gloria R. Weeks
(74) *Attorney, Agent, or Firm*—Global IP Counselors, LLP

(57) ABSTRACT

A production system is provided in which high production efficiency can be maintained in the entire production line even in cases in which there is a lack of uniformity in the rates at which the articles are actually supplied from a supply unit; the weighing unit, packaging unit, quality inspection unit, or other constituent device has stopped operating; or other problems have occurred. In this production system, a centralized control system controls the set capacities of devices that constitute a production line including a weighing device, a bagging machine, and other devices disposed downstream, so that the capacities are varied on the basis of the detection results of a supply rate detection sensor of a supply device, that is, on the basis of the actual rates of supply from the supply device to the weighing device.

8 Claims, 8 Drawing Sheets

U.S. PATENT DOCUMENTS

| | | | |
|---|---|---|---|
| 6,945,008 B2 * | 9/2005 | Nakagawa et al. | 53/52 |
| 7,002,082 B2 * | 2/2006 | Kageyama et al. | 177/25.18 |
| 7,038,145 B2 * | 5/2006 | Fujii | 177/25.18 |
| 7,076,935 B2 * | 7/2006 | Basque | 53/551 |
| 7,093,625 B2 * | 8/2006 | Smith et al. | 141/67 |
| 7,368,670 B2 * | 5/2008 | Hjalmarsson | 177/25.18 |
| 2002/0043445 A1 * | 4/2002 | Yokota et al. | 198/457.03 |
| 2003/0000179 A1 * | 1/2003 | Nakagawa et al. | 53/493 |
| 2005/0193689 A1 * | 9/2005 | Basque | 53/451 |

FOREIGN PATENT DOCUMENTS

| | | |
|---|---|---|
| GB | 1 485 303 | 9/1977 |
| JP | 9/301327 A | 11/1997 |
| JP | 2003-233407 A | 8/2003 |

* cited by examiner

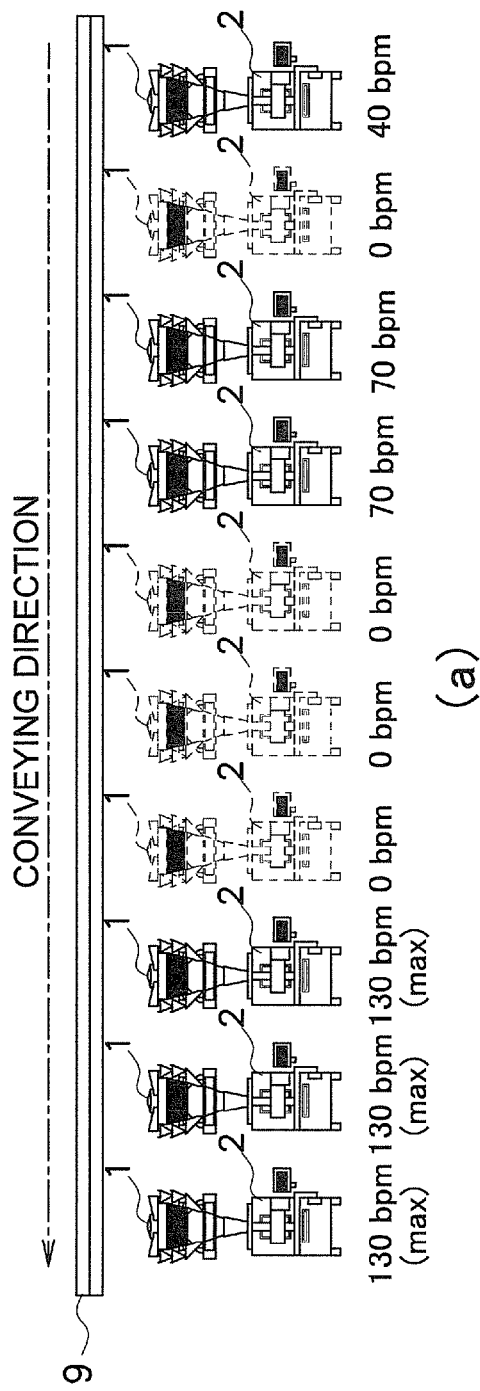
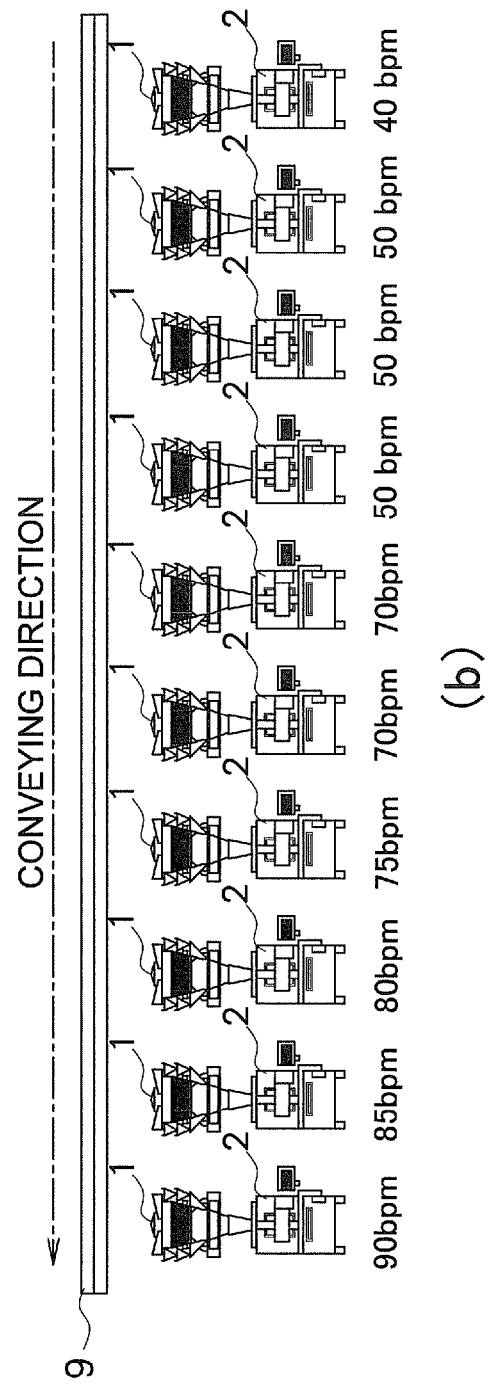
Fig. 4

PRODUCTION SYSTEM

BACKGROUND OF THE INVENTION

1. Field of the Invention

The present invention relates to a production system that is configured by disposing, downstream of a supply device for supplying foodstuffs or other such articles, a plurality of constituent devices including a weighing machine for weighing articles, a packaging machine, and a seal checker or another such quality inspection device.

2. Background Information

In conventional practice, production systems in use include a weighing unit for weighing foodstuffs or other such articles supplied from a supply unit, a packaging unit for packaging the weighed articles, a quality inspection unit for detecting the quality of the packaged articles, and other various devices.

For example, Japanese Laid-Open Patent Application No. 9301327 (published Nov. 25, 1997) discloses a management method and a management device (production system) for a production line that varies the set capacities of certain devices according to the processing capacities (yield rate) of other devices disposed downstream when operation is initiated or during operation. Since the set capacities of these devices are varied on the basis of the processing capacities (yield rate) of the other devices, the yield rate of the entire production line can be improved, and higher capacities can be elicited from the devices to improve production efficiency.

However, this conventional production system has the following problems.

Specifically, in the production system disclosed in the aforementioned publication, the set capacities are varied on the basis of the processing capacities (yield rate) of the devices, making it impossible to deal with problems such as a lack of uniformity in the rates at which articles are fed from the supply unit in the weighing unit during operation and halted operation of one weighing unit in a plurality of weighing units.

For example, when articles are supplied from the supply unit at non-uniform rates while the set capacities of the supply unit for supplying articles to the weighing unit are kept constant, the set capacity of the weighing unit is set in accordance with the setting of the supply unit. Therefore, fluctuations in the supply rates cannot be appropriately dealt with merely by performing control based on the processing capacities or the yield rates of the devices, and production cannot be carried out efficiently.

When the operation of a single weighing unit among a plurality of weighing units is halted due to a malfunction, a control procedure is performed to increase the set capacities of the other weighing units because the operating rate of the single weighing unit is zero. However, in such cases as well, merely allocating a processing rate that is proportionate to the operating rate reduction to the other weighing units brings the operating rate of the other weighing units closer to the maximum set capacities, and may instead result in a lower yield rate and reduced production quantities.

In view of the above, it will be apparent to those skilled in the art from this disclosure that there exists a need for an improved production system in which high production efficiency can be maintained in the entire production line, even in cases in which the articles are actually supplied from the supply unit at non-uniform rates, some of the weighing units, packaging units, quality inspection units, and other constituent units stop operating, and/or other problems occur. This invention addresses this need in the art as well as other needs, which will become apparent to those skilled in the art from this disclosure.

SUMMARY OF THE INVENTION

The production system according to a first aspect of the present invention includes a supply unit configured to supply articles, a plurality of constituent devices, a supply rate detection unit, and a control unit. The constituent devices are configured to perform processes on the articles supplied from the supply unit. The supply rate detection unit is configured to detect the rate at which the articles are actually supplied from the supply unit. The control unit is configured to vary the set capacities of the constituent devices on the basis of the detection results of the supply rate detection unit.

The set capacities of the constituent devices of the production system disposed downstream are herein varied according to the rate in which the articles are actually supplied.

The constituent devices of the production system include, for example, a weighing unit for weighing articles, a packaging unit for packaging weighed articles, a quality inspection unit for performing various inspections on the packaged articles, and other devices. A sensor or the like provided between the supply unit and the constituent device to which the articles are supplied from the supply unit, for example, can be used as the supply rate detection unit.

Generally, in a production system that includes a weighing unit for weighing supplied articles, a packaging unit for packaging the weighed articles, and a quality inspection unit for performing inspections on the packaged articles, and other devices, the set capacities of the weighing unit, the packaging unit, and the quality inspection unit disposed downstream are varied based on the set supply rate in the supply unit for supplying articles to the weighing unit. Therefore, in cases such as when batches of articles are supplied by the supply unit, a lack of uniformity can occur in the rates at which the articles are actually supplied to the weighing unit even if the set capacity of the supply unit is constant. In such cases, if the set capacities of the weighing unit, the packaging unit, and the quality inspection unit are varied in accordance with the maximum supply rate, the weighing unit may not function satisfactorily when the supply rate is low. If the set capacity of the constituent device such as weighing unit is varied in accordance with the minimum supply rate, the constituent device such as the weighing unit may no longer be able to function and may become jammed when the supply rate is high.

The production system of the present invention includes a supply rate detection unit for detecting the actual rate at which articles are supplied from the supply unit, in which the control unit does not vary the set capacities of the supply unit, but instead varies the set capacities of the weighing unit, the packaging unit, the quality inspection unit, and other constituent devices, according to the detection results of the supply rate detection unit.

The operating efficiency and the processing yield of the constituent devices can thereby be improved, and the actual processing rate can be maintained at high levels without being reduced, by controlling the set capacities of the constituent devices constituting the production system so that they vary according to the rate in which the articles are actually supplied.

The production system according to a second aspect of the present invention is the production system according to the first aspect, wherein the constituent devices include a weighing unit configured to weigh articles supplied from the supply unit, a packaging unit configured to package weighed articles, and a quality inspection unit configured to inspect the quality of packaged articles.

A weighing unit, a packaging unit, and a quality inspection unit are herein used as the constituent devices whose set capacities are controlled by the control unit on the basis of the actual supply rates.

Possible examples of the quality inspection unit include a seal checker that inspects the airtightness with which the articles are packaged, a weight checker that inspects whether the weight of the articles is within a suitable range, a metal detecting device and X-ray detecting device for inspecting whether bagged articles contain metals or other such impurities, an appearance inspecting device for inspecting the outward appearance of articles, a distribution device for excluding defective products from the conveying line, a box packing device for boxing up articles, or the like.

Thereby, in a production system that includes a weighing unit, a packaging unit, and a quality inspection unit as constituent devices, efficient production can be achieved with a high yield rate in the processes of the constituent devices even when a lack of uniformity occur in the rates at which articles are supplied to these constituent devices from the supply unit, because the set capacities of the constituent devices are varied based on the actual supply rates of the supply unit.

The production system according to a third aspect of the present invention is the production system according to the first or second aspect, wherein the control unit is configured to vary the set capacities of the constituent devices so that the actual processing rate in the constituent devices is not reduced.

The set capacities in the plurality of constituent devices are varied in view of the actual processing rate. Specifically, the set capacity of each of a plurality of weighing units is varied, for example, so that the actual processing rate is not reduced due to a decrease in the yield rate even if the capacity of a specific weighing unit of a plurality of weighing units is increased.

Efficient processing can thereby be achieved while the set capacities are kept at an suitable set level at which the yield rate increases.

The production system according to a fourth aspect of the present invention is the production system according to any of the first through third aspects, wherein the control unit is configured to perform control so that the set capacities of the constituent devices do not reach a maximum.

The settings are herein controlled so that the set capacity of a specific weighing unit as one of a plurality of weighing units does not reach a maximum, and the set capacities of the other weighing units are varied to achieve a high yield rate overall.

Efficient processing can thereby be achieved while maintaining the set capacities of the constituent devices at a suitable level at which a high yield rate is achieved.

The production system according to a fifth aspect of the present invention is the production system according to any of the first through fourth aspects, wherein the control unit is configured to vary the set capacities so that the processing yield in the constituent devices reaches a maximum when the rates at which articles are supplied from the supply unit increases.

The set capacities of the constituent devices are not simply increased when the supply rate increases, but the set capacities are varied so that the processing yield of one of the weighing units or another constituent device reaches a maximum. Specifically, depending on the situation, control may be performed such that the set capacity of the weighing unit or another constituent device is reduced to maximize the yield rate, even if the supply rate increases.

It is thereby possible to avoid instances wherein the actual processing rate in the constituent devices decreases due to a decrease in the yield rate, even if the supply rate increases and the set capacities are increased.

The production system according to a sixth aspect of the present invention is the production system according to any of the first through fifth aspects, wherein the control unit is configured to set the set capacities of the plurality of similar constituent devices disposed in series with respect to the supply unit so that units that are disposed farther downstream have higher set capacities, when similar constituent devices included in the plurality of constituent devices are disposed in series with respect to the supply unit.

In a plurality of similar constituent devices disposed in series with respect to the supply unit, the set capacities of the constituent devices are varied so that the set capacities gradually increase in constituent devices farther away from the supply unit.

Thereby, when the similar constituent devices are weighing units, for example, it is possible to prevent instances wherein articles processed by weighing units disposed upstream fail to be supplied to the weighing units disposed downstream. As a result, it is possible to achieve a high yield rate in operation with suitable set capacities in all of the weighing units disposed in series with respect to the supply unit.

This type of control is preferably used in cases in which foodstuffs are the articles subjected to weighing, packaging, various inspections, and other processes. For example, in a production line for handling foodstuffs such as potato chips, the manufactured potato chips are fed to the supply unit in batches. Therefore, since a lack of uniformity occurs in the supply rates from the supply unit, the set capacities of the weighing units must be varied so that a lack of uniformity can be dealt with when the supply rate reaches a maximum. When, however, all of the weighing units have the same set capacities and the supply rate decreases, the processing rate may reach zero so that no articles at all reach the downstream weighing units, regardless of whether the upstream weighing units are functioning at maximum capacity. In view of this, according to the production system of the present invention, the set capacities of the weighing units are varied according to fluctuations in the actual supply rates, and the set capacities of the weighing units are made different according to their arrangement, whereby all of the weighing units can be made to operate efficiently with a high yield rate.

The production system according to a seventh aspect of the present invention is the production system according to any of the first through sixth aspects, wherein the articles are supplied to the supply unit in batches.

Articles are herein discharged into the supply unit in batches. Therefore, the rates at which the articles are actually supplied to the weighing units and other constituent devices will become non-uniform as a result of the lack of uniformity in the rates at which articles are fed to the supply unit, even when the set capacity of the supply unit is constant.

The production system of the present invention includes a supply rate detection unit for detecting the actual supply rates, wherein the set capacities of the weighing unit, the packaging unit, the quality inspection unit, and other constituent devices disposed downstream are varied by detecting these actual supply rates.

Therefore, it is possible to achieve efficient operation while maintaining a high yield rate in the processes of the constituent devices disposed downstream, even when articles are fed at non-uniform rates from the supply unit in this manner.

The production system according to an eighth aspect of the present invention includes a supply unit, a plurality of constituent devices, a storage unit, an operating rate detection unit, and a control unit. The supply unit is configured to supply articles to the plurality of constituent devices. The plurality of constituent devices are configured to process the articles supplied from the supply unit. The storage unit configured to store a production schedule for the articles produced in the production system. The operating rate detection unit is configured to detect the operating rate of the constituent devices. The control unit is configured to vary the set capacities of the constituent devices so as to achieve a high yield rate in the constituent devices during operation, based on the production schedule stored in the storage unit and the detection results of the operating rate detection unit.

The set capacities of the constituent devices are herein varied based on the production schedule that indicates production volume quotas and the like, and on the current operating rate of the constituent devices.

Possible examples of the constituent devices of the production system include a weighing unit for weighing articles, a packaging unit for packaging weighed articles, and a seal checker or another such quality inspection unit for performing various inspections on the packaged articles.

Generally, in a production system that includes weighing units for weighing supplied articles, a packaging unit for packaging weighed articles, a quality inspection unit for inspecting packaged articles, and other devices, the weighing units and the quality inspection unit are operated at set capacities that are set based on a production plan. Therefore, for example, cases in which a weighing unit malfunctions during operation and the operating rate reaches zero are dealt with by increasing the operating rate of the other weighing units. However, in such cases, merely redistributing the workload of the weighing unit whose operating rate is zero equally among the other weighing units may result in the operating rates of the other weighing units nearing their maximum and the yield rate decreasing.

In the production system of the present invention, the set capacities are varied so that the yield rate is increased by taking into account the production schedule and the operating rates of the constituent devices, that is, so as not to reduce the yield rate by increasing the set capacities.

The operating efficiency and the processing yield of the constituent devices can thereby be improved, and the actual processing rate can be maintained at a high level without being reduced.

According to the production system of the present invention, the operating efficiency and the processing yield of the constituent devices can thereby be improved, and the actual processing rate can be maintained at a high level without being reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 4(a) and (b) are diagrams showing an example of the control of the set capacities in a production system in which a plurality of production lines are disposed per one supply device;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A production system according to one embodiment of the present invention is described hereinbelow with reference to FIGS. 1 through 5.

Configuration of Overall Production System

Figure 1:
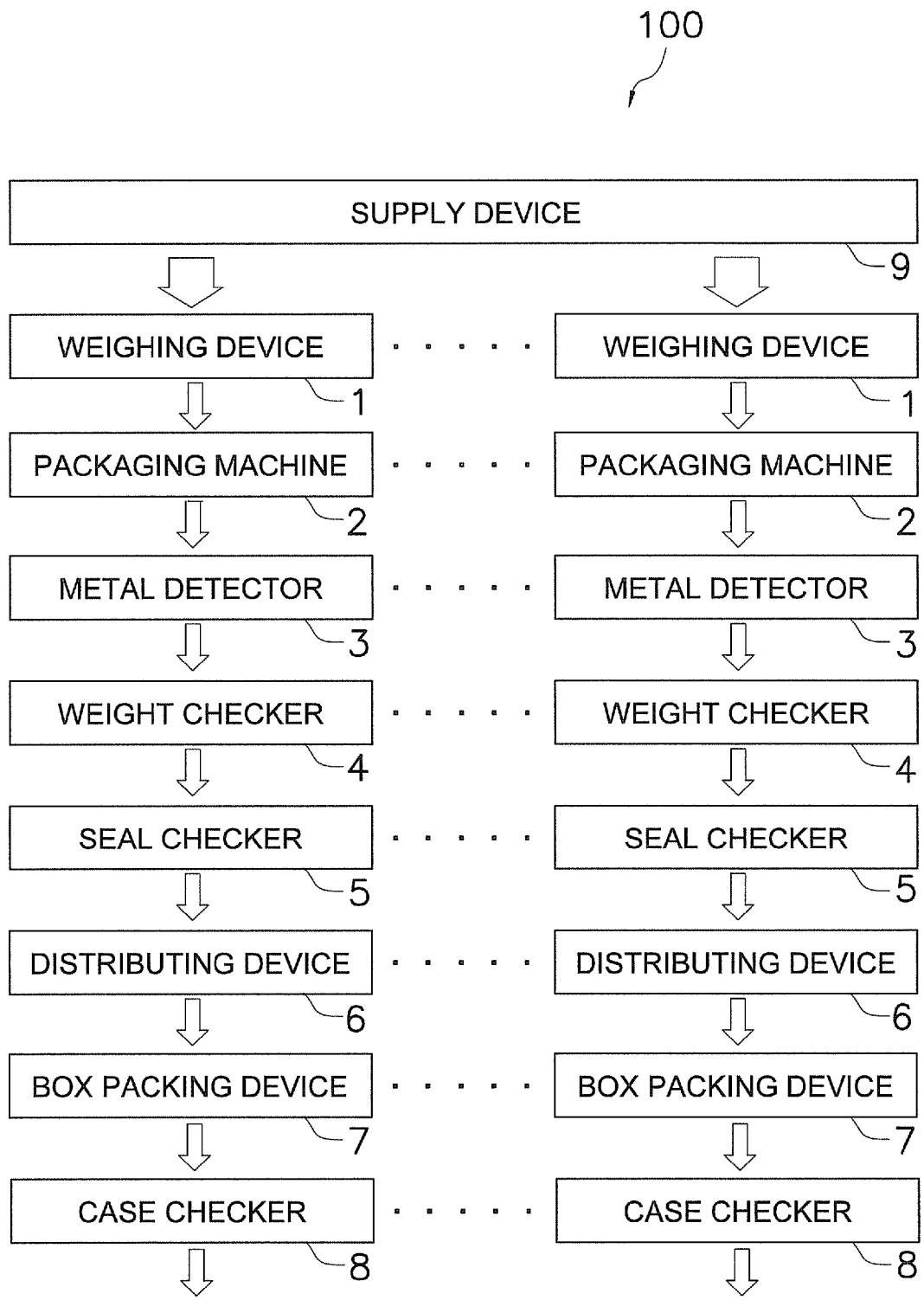
FIG. 1 is a block diagram showing a plurality of production lines in the production system according to one embodiment of the present invention.
Figure 3:
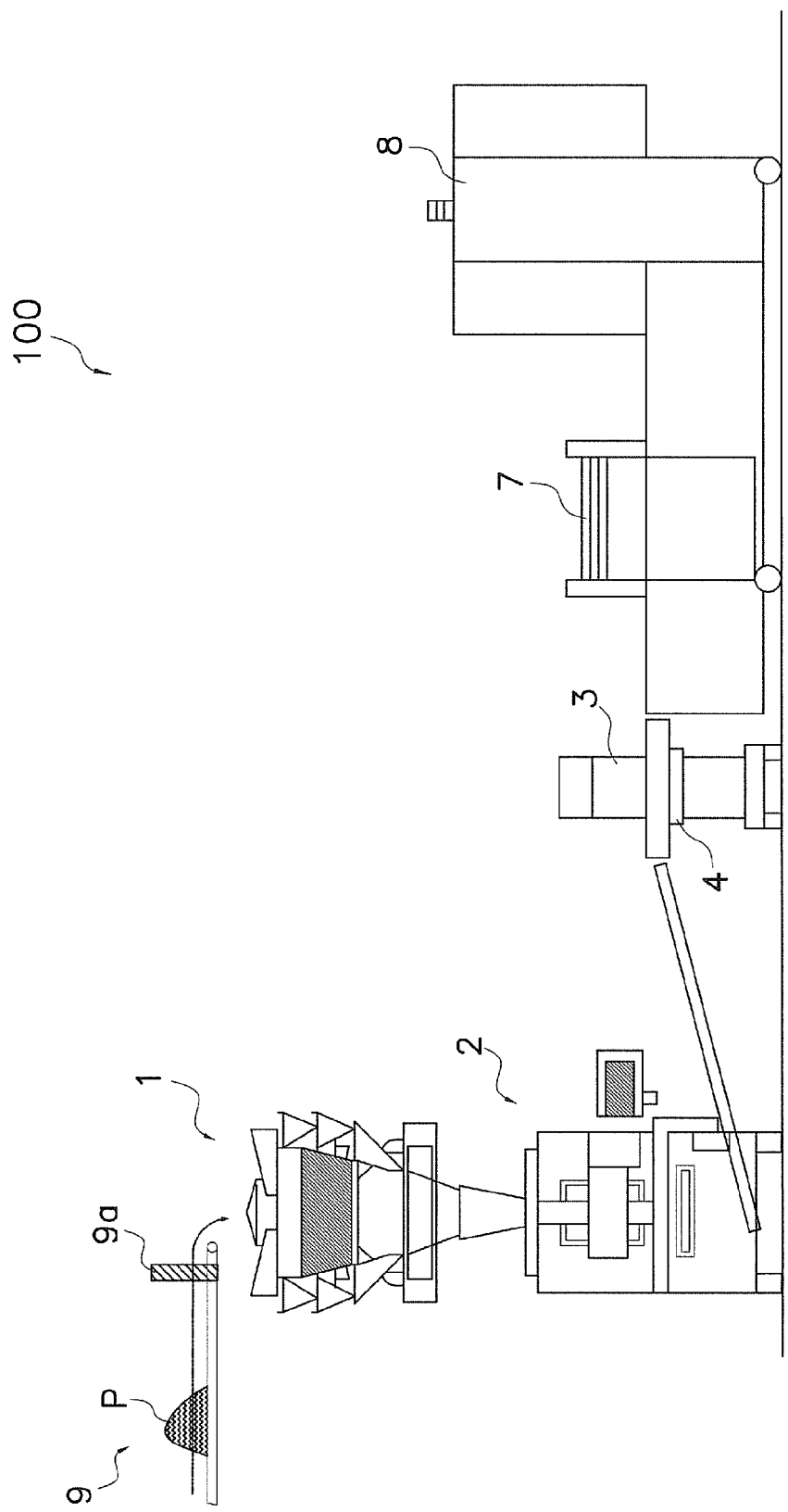
FIG. 3 is a front view showing the constituent devices included in one of the production lines in FIG. 1.

The production system 100 according to the present embodiment has a plurality of production lines that each include a weighing device (constituent device, weighing unit) 1, a bagging machine (constituent device, packaging unit) 2, a metal detector (constituent device, quality inspection unit) 3, a weight checker (constituent device, quality inspection unit) 4, a seal checker (constituent device, quality inspection unit) 5, a distributing device (constituent device, quality inspection unit) 6, a box packing device (constituent device, quality inspection unit) 7, a case checker (constituent device, quality inspection unit) 8 for checking the weight of an entire case, and a supply device (supply unit) 9, as shown in FIGS. 1 and 3. These devices 1 through 9 are mutually connected by a conveyor or the like and operate in conjunction with each other. These devices weigh, package, and handle the articles (weighed articles P) (see FIG. 3) supplied from the supply device 9.

The weighing devices 1 receive and weigh the weighed articles P supplied from the supply device 9, and perform combined weighing by using all of the weighing results. The weighing devices 1 also make a combined calculation on the basis of the weighing results of the weighing hoppers, and select a combination in which the combined weight has a value within a specific allowable range. The weighed articles P that are part of this combination are then discharged from the weighing hoppers and gathered, and small groups of weighed articles P whose weight is within the specific range are collected. The weighing devices 1 further have a dispersion table (not shown) that oscillates to disperse the weighed articles P in a radial pattern, a plurality of oscillating feeders disposed in a radial pattern on the periphery, a plurality of pool hoppers that are disposed in a circular formation for temporarily retaining the weighed articles P that have fallen from the supply troughs of the oscillating feeders, and an equal number of weighing hoppers disposed underneath each of the pool hoppers.

The bagging machine 2 receives the weighed articles P that are selected and discharged as a result of the combined calculations of the weighing devices 1, and packages these articles in the manufactured bags. The bagging machine 2 also has a folding mechanism, a lengthwise sealing mechanism, a feeding mechanism, a cutting mechanism, and a widthwise sealing mechanism (not shown). The folding mechanism folds a film sheet pulled out from a film roll so that the edges on both sides overlap. The lengthwise sealing mechanism forms the overlapped parts of the folded film sheet into a cylinder shape by heat sealing. The feeding mechanism conveys this cylinder by a specific distance in the longitudinal direction while it is held on both sides from the width direction. The cutting mechanism cuts the cylinder into specific sizes. The widthwise sealing mechanism seals the openings of the cut cylinder. In addition, in the bagging machine 2, the weighed articles P discharged from the weighing devices 1 are introduced into the cylinders while the cylinders are being conveyed by the feeding device.

The metal detector 3, the weight checker 4, the seal checker 5, the distributing device 6, the box packing device 7, and the case checker 8 are devices that perform various inspections on the weighed articles P introduced into the manufactured bags as products. For example, the weight checker 4 performs an inspection as to whether or not the weight of the weighed articles P weighed in bulk by the weighing devices 1 and introduced into the bags is within the allowable range. In addition, the seal checker 5 performs an inspection as to whether or not the bags made by the bagging machine 2 are tightly sealed. The distributing device 6 distributes the bags containing weighed articles P deemed to be unsatisfactory by the weight checker 4 and the seal checker 5 to the outside of the conveying path. The box packing device 7 packages the bags containing weighed articles P deemed to be satisfactory into cardboard boxes. The case checker 8 checks for excesses and deficiencies in the cardboard boxed products. These devices 3 through 8 are conventional devices, and therefore detailed descriptions of their configurations are herein omitted.

Figure 2:
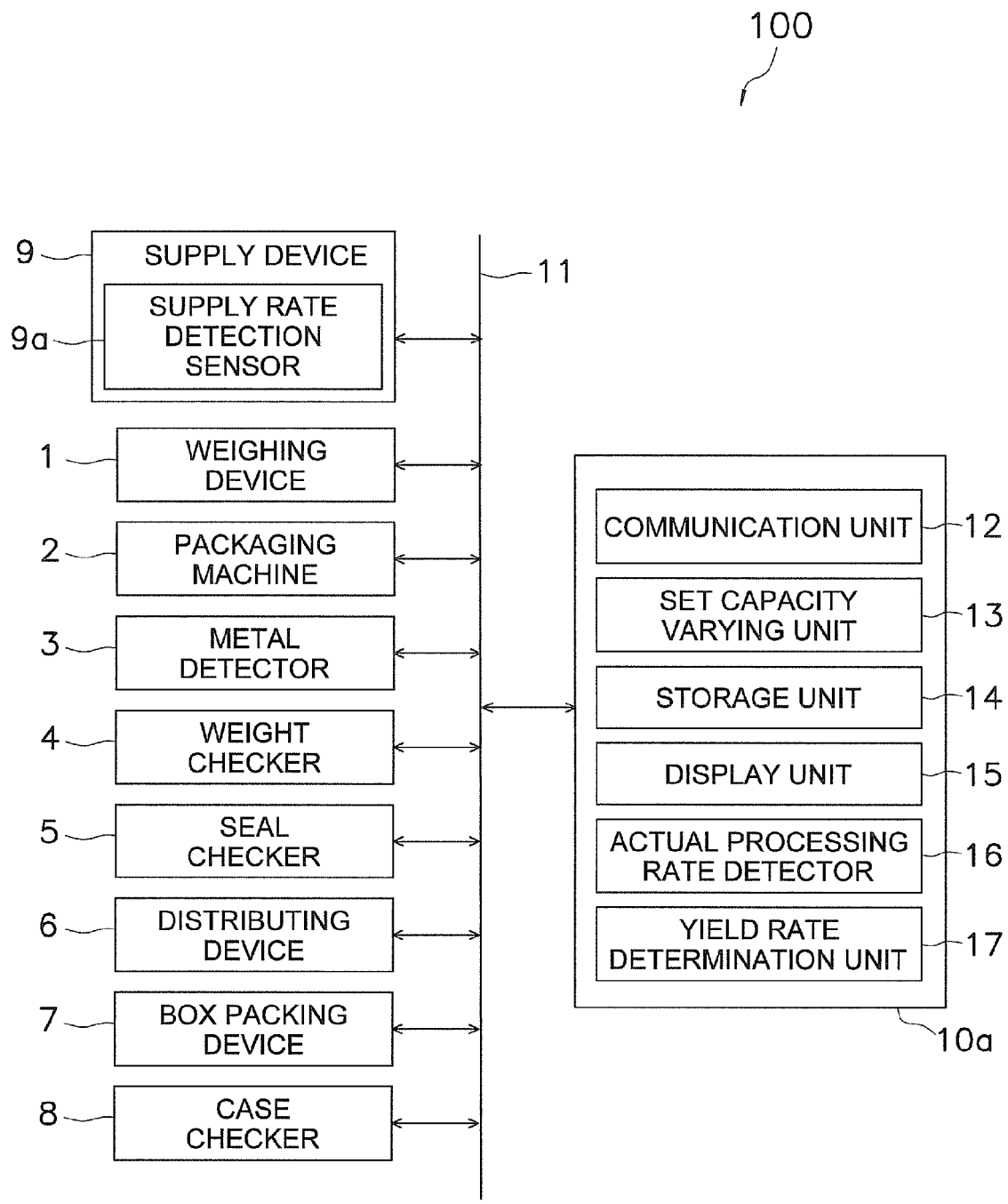
FIG. 2 is a block diagram showing the configuration of the production system that includes the production lines in FIG. 1.

Although not shown in the diagrams, the supply device 9 includes a supply conveyor, a drive mechanism, and a supply rate detection sensor (supply rate detection unit) 9a (see FIGS. 2 and 3). The supply conveyor conveys the weighed articles P placed on an endless conveyor onto the distribution feeders of the weighing devices 1 as a result of the conveyor being rotated by the drive mechanism. The supply rate detection sensor 9a is disposed on the downstream end of the supply conveyor, as shown in FIG. 3. The sensor detects the rate at which the weighed articles P are actually conveyed on the basis of the total thickness of the weighed articles P being conveyed by the supply conveyor, and transmits this information to a centralized control device (control unit) 10a (see FIG. 2). The supply device 9 then rotates the supply conveyor according to the conveying speed controlled by the centralized control device 10a, and feeds the weighed articles P on the supply conveyor to the weighing devices 1 disposed downstream.

Centralized Control System of Production System 100

In the production system 100 of the present embodiment, a plurality of production lines for producing boxed products containing the weighed articles P are controlled centrally, as shown in FIG. 2. The devices 1 through 9 in the production lines are controlled centrally by the centralized control device 10a connected via a communication circuit 11, and all of the information generated in the production lines is summarized and controlled.

The centralized control device 10a includes a communication unit 12, a set capacity varying unit 13, a storage unit 14, a display unit 15, and an actual processing rate detector 16.

The communication unit 12 transmits and receives various types of information among the devices 1 through 9 in the production line.

The set capacity varying unit 13 varies the set capacities of the weighing devices 1, the bagging machine 2, and the other devices 1 through 8 in the production line, according to the detection result (actual supply rate) of the supply rate detection sensor 9a of the supply device 9.

The storage unit 14 stores information pertaining to the maximum set capacities of the devices 1 through 8 in the production line, and also stores information pertaining to the production schedule, in addition to the processing conditions of the entire production line (line speed, production volume, and the like), the processing conditions of the devices 1 through 9, and processing results.

The display unit 15 displays the processing conditions, aspects, and other attributes of the devices 1 through 9 in the production line.

The actual processing rate detector 16 determines the number of acceptable products (actual processing rate) that are actually processed by the devices 1 through 8 in the production line. The configuration may be designed so that the actual processing rates detected in the devices 1 through 8 are received by the actual processing rate detector 16.

A yield rate detection unit 17 determines the yield rate of the devices 1 through 8 as the ratio between the number of actual processing routines in the devices 1 through 8 in the production line and the number of acceptable products in the production line. The configuration may be designed so that the yield rates that are detected in the devices 1 through 8 are received by the yield rate detection unit 17.

The method that the yield rate detection unit 17 uses to calculate the yield rates of the devices 1 through 8 and the entire production line is described below.

The yield rates of the weighing devices 1 are calculated by detecting the ratio between the number of products that have the specific target weight or a value within an allowable range close to this target weight based on the combined calculations, and the total number of products, including the number of products determined by the weighing devices 1 to be unsatisfactory. The yield rate of the bagging machine 2 is calculated by detecting the ratio between the total number of products and the number of total packaged products less the number of defective products that have unsatisfactory seals or the like. The yield rates of the weight checker 4, the distributing device 6, the box packing device 7, and the case checker 8 are calculated by detecting the ratio between the quantities supplied to these devices and the number obtained by subtracting the quantities rejected by these devices.

The yield rate of the entire production line is specifically calculated by detecting the ratio between the number of products processed as acceptable products, and the total processed number, including products discharged as defective products.

The devices 1 through 8 also include a controller, memory, and communication unit (not shown), and the communication unit of the devices 1 through 8 and the communication unit 12 of the centralized control device 10a are connected via the communication circuit 11.

A LAN (local area network), for example, is used for the communication circuit 11. Data (processing information and the like) pertaining to the weighed articles P is transmitted and received between the centralized control device 10a and the devices 1 through 8 by a token ring, token passing, packet communication, or the like.

The data pertaining to the weighed articles P is transmitted to the downstream devices 1 through 8. For example, weight signals and weighing abnormality signals correspond to the weighing devices 1; packaging completion signals and faulty processing signals that stop sealing or cutting operations correspond to the bagging machine 2; and satisfactory/unsatisfactory detection signals correspond to the metal detector 3, the weight checker 4, and the seal checker 5. As part of the data pertaining to the weighed articles P, the processing information of upstream devices is transmitted to the downstream devices in accordance with the timing by which the input sensors of the devices 1 through 8 detect that the weighed articles P are being delivered. When the output sensors detect that the weighed articles P are being delivered from the devices, the upstream transmitted information and the processing information of the devices are transmitted to the downstream devices. Thus, processing information for each of the devices is obtained for each group of weighed articles P, and this processing information is stored in the memory of the devices 1 through 8. The processing information for each of the devices 1 through 8 is displayed on the display unit 15 of the centralized control device 10a via the communication circuit 11. Therefore, the processing aspects (starting/stopping of operations of the devices 1 through 8, normal/abnormal operation, yield rate of weighed articles P, and other aspects) of the entire line can be easily perceived, and factors that cause problems, such as what kind of abnormalities are occurring in which device, can be readily identified by comparing the processing information in the devices for each weighed article P.

For example, with certain weighed articles P, an abnormality has clearly occurred in an intermediate device when the weight signal of a weighed article P obtained by subtracting the weight of the packaging bags in the weight checker 4 is greater than the weight signal of the weighed article P in the weighing devices 1.

In this case, the cause is believed to be that deposits have adhered to the weighed articles P after the articles have been weighed by the weighing devices 1, that impurities have become mixed in the bagging machine 2, or the like. For example, when the weight signal in the weight checker 4 for the weighed articles P is greater than the weight signal of the weighing devices 1 over substantially constant time intervals, it is determined that this is caused by the accumulation of deposits on the hoppers. The reason is that these deposits have fallen and added to the weight after the articles have been weighed by the weighing devices 1, and therefore the hoppers must either be cleaned or replaced.

Thus, the processing information about the weighed articles P in the devices 1 through 8 is transmitted to the devices downstream as the weighed articles P are moved by the conveyor. The centralized control device 10a observes the processing information displayed on the display unit 15, and can therefore specify the cause of the abnormalities on the basis of this information.

Controlling the Variation of Set Capacities in Production System 100

In the production system 100 of the present embodiment, the variation of set capacities during the operation of the devices 1 through 8 described above is controlled based on the results detected by the supply rate detection sensor 9a of the supply device 9.

Normally, the supply device 9 drops the weighed articles P that are on the conveyor onto the dispersion table of the weighing devices 1 while rotating the supply conveyor at a constant speed. Therefore, if the rotational speed of the supply conveyor is constant, then the rate at which articles are fed to the weighing devices 1 should also be constant. In practice, however, the weighed articles P are sometimes fed in batches by the supply device 9, and a lack of uniformity sometimes occurs in the rates at which detected articles move with the supply conveyor. The articles are supplied in batches in this manner particularly in a production line in which the weighed articles P are foodstuffs (potato chips or the like, for example). In this case, there are sometimes large differences between the supply rate of weighed articles P as calculated from the rotational speed of the supply conveyor in the supply device 9, and the rate at which the weighed articles P are actually fed to the weighing devices 1. Thus, when a lack in uniformity occurs in the rates at which the weighed articles P are fed from the supply device 9 to the weighing devices 1, accurately controlling the variation of the set capacities of the weighing devices 1 and other conventional devices 1 through 8 in the production line in accordance with the fluctuation in the supply rates is difficult to accomplish using the set capacity of the supply device 9 as a reference.

In the production system 100 of the present embodiment, as described above, the centralized control device 10a varies the set capacities in the weighing devices 1 and other constituent devices of the production lines. The control device operates on the basis of the rates at which the weighed articles P are actually fed (actual supply rates) to the weighing devices 1 as detected by the supply rate detection sensor 9a of the supply device 9.

Specifically, if the set capacity of the supply device 9 is constant and it is clear from the detection results of the supply rate detection sensor 9a that the actual rate of supply to the weighing devices 1 has been reduced, the set capacity varying unit 13 performs control so as to lower the set capacities of the entire production lines that include the weighing devices 1. In addition, if the set capacity of the supply device 9 is constant, and it is clear from the detection results of the supply rate detection sensor 9a that the actual rate of supply to the weighing devices 1 has increased, the set capacity varying unit 13 performs control so as to raise the set capacities of the entire production line that includes the weighing devices 1.

It is thereby possible to more accurately control the variation of the set capacities on the basis of the actual supply rates than when the variation of the set capacities of the downstream devices 1 through 8 in the production line is controlled using the set capacity of the supply device 9 as a reference.

In the particular case of an increase in the set capacity of the supply device 9, a control procedure is normally performed to increase the set capacities of the downstream devices 1 through 8 as well. However, in the production system 100 of the present embodiment, the set capacities of the downstream devices 1 through 8 are never increased as long as the actual supply rates as detected by the supply rate detection sensor 9a do not increase, even if the set capacity of the supply device 9 has been increased. Furthermore, a control procedure is performed so as to increase the set capacities of the downstream devices 1 through 8 when the actual supply rates have decreased, even if the set capacity of the supply device 9 has been increased. Therefore, the set capacities of the downstream devices 1 through 8 can be set to suitable levels to achieve efficient production even when there is a large difference between the set capacity of the supply device 9 and the actual supply rates.

Even if the weighed articles are supplied from the supply device 9 in batches, the set capacities of the downstream devices 1 through 8 are varied based on the actual rates of supply from the supply device 9, whereby the most effective production can be achieved regardless of the set capacity of the supply device 9.

The centralized control device 10*a* further includes an actual processing rate detector 16. Therefore, control is performed so that the actual processing rates of the devices 1 through 8 (the number of acceptable products actually processed), as determined by the actual processing rate detector 16, do not decrease when the variation of the set capacities of the devices 1 through 8 is controlled based on the actual supply rates as described above.

Specifically, when an increase in a set capacity causes the yield rate to decrease (percent defective to increase) and the rate at which acceptable products are processed to be reduced, a control procedure is performed to reduce the set capacities. More efficient production can thereby be achieved because decreases in production efficiency can be further avoided in comparison with cases in which the set capacities of the downstream devices 1 through 8 are varied based solely on the actual supply rates.

Furthermore, when the variation of the set capacities of the devices 1 through 8 in the production line is controlled based on the actual supply rates as described above, the centralized control device 10*a* controls the set capacities of the devices 1 through 8 so that they do not approach the maximum levels stored in the storage unit 14, even when the supply rate detection sensor 9*a* has detected that the actual supply rates have increased.

Normally, the nearer the set capacities of the weighing devices 1, the bagging machine 2, and the other devices draw to their maximum levels, the more the yield rate decreases, and the greater the rate of defective products. Therefore, production efficiency may decrease if the variation of the set capacities of the downstream devices 1 through 8 is controlled based simply on the actual rates of supply from the supply device 9.

In view of this, in the present embodiment, the centralized control device 10*a* controls the set capacities of the devices 1 through 8 by referring to the maximum set capacities of the devices 1 through 8 in addition to the detection results of the supply rate detection sensor 9*a* of the supply device 9.

It is thereby possible to further increase the efficiency of production by suppressing instances in which the yield rate decreases and the actual processing rates of acceptable products are reduced as a result of the weighing devices 1 approaching their maximum set capacities, for example.

The centralized control device 10*a* further includes a yield rate detection unit 17. Therefore, in the production system 100 of the present embodiment, the set capacities can be varied so that the detection results of the yield rate detection unit 17, that is, the yield rate of the devices 1 through 8, increase, for example, to 98% or greater even when the supply rate detection sensor 9*a* of the supply device 9 has detected that the actual supply rates have increased.

A production system with higher productivity can thereby be constructed, because the yield rate is determined and the set capacities are varied instead of the set capacities of the devices 1 through 8 being varied by merely using the actual supply rates as a reference.

FIGS. 4(*a*) and 4(*b*) are used to describe hereinbelow the manner in which the set capacities are controlled when the weighed articles conveyed from one supply device 9 are processed while being distributed among a plurality of production lines disposed in series.

Normally, in cases in which the weighed articles conveyed from one supply device 9 are processed while being distributed among a plurality of production lines as shown in FIG. 4(*a*), the weighed articles to the weighing devices 1 in each production line is supplied so that the weighed articles are fed at a higher rate to the weighing devices 1 of the production lines disposed upstream than the weighing devices 1 disposed downstream. Therefore, in the production system 100 of the present embodiment, the supply device 9 is controlled so that the rate at which the articles are fed to the weighing devices 1 disposed upstream is far less than their processing capacities, and the actual rates at which the articles are fed to the weighing devices 1 disposed downstream are greater as one moves farther downstream, as shown in FIG. 4(*a*).

It is thereby possible to achieve more efficient operation by preventing inefficient states of operation, in which weighed articles cease to be supplied to the weighing devices 1 disposed downstream as a result of the weighing devices 1 disposed upstream operating at their maximum processing capacities.

In addition, in the example shown in FIG. 4(*a*), the three weighing devices 1 disposed downstream are operating at settings that correspond to their maximum processing capacities because some of the production lines have stopped operating. Therefore, since the yield rates have decreased for the weighing devices 1 operating at maximum processing capacities as described above, the weighing devices 1 that have stopped operating are restarted, and a control procedure is performed so as to decrease the set capacities of the three weighing devices 1 that are disposed farthest downstream and that are operating at their maximum processing capacities, as shown in FIG. 4(*b*).

Thus, restarting an idle weighing device 1 and operating all of the weighing devices 1 makes it possible to prevent instances in which the yield rate and productivity are reduced by continued operation of a specified weighing device 1 at its maximum processing capacity. As a result, a production system with high productivity can be constructed.

Figure 5:
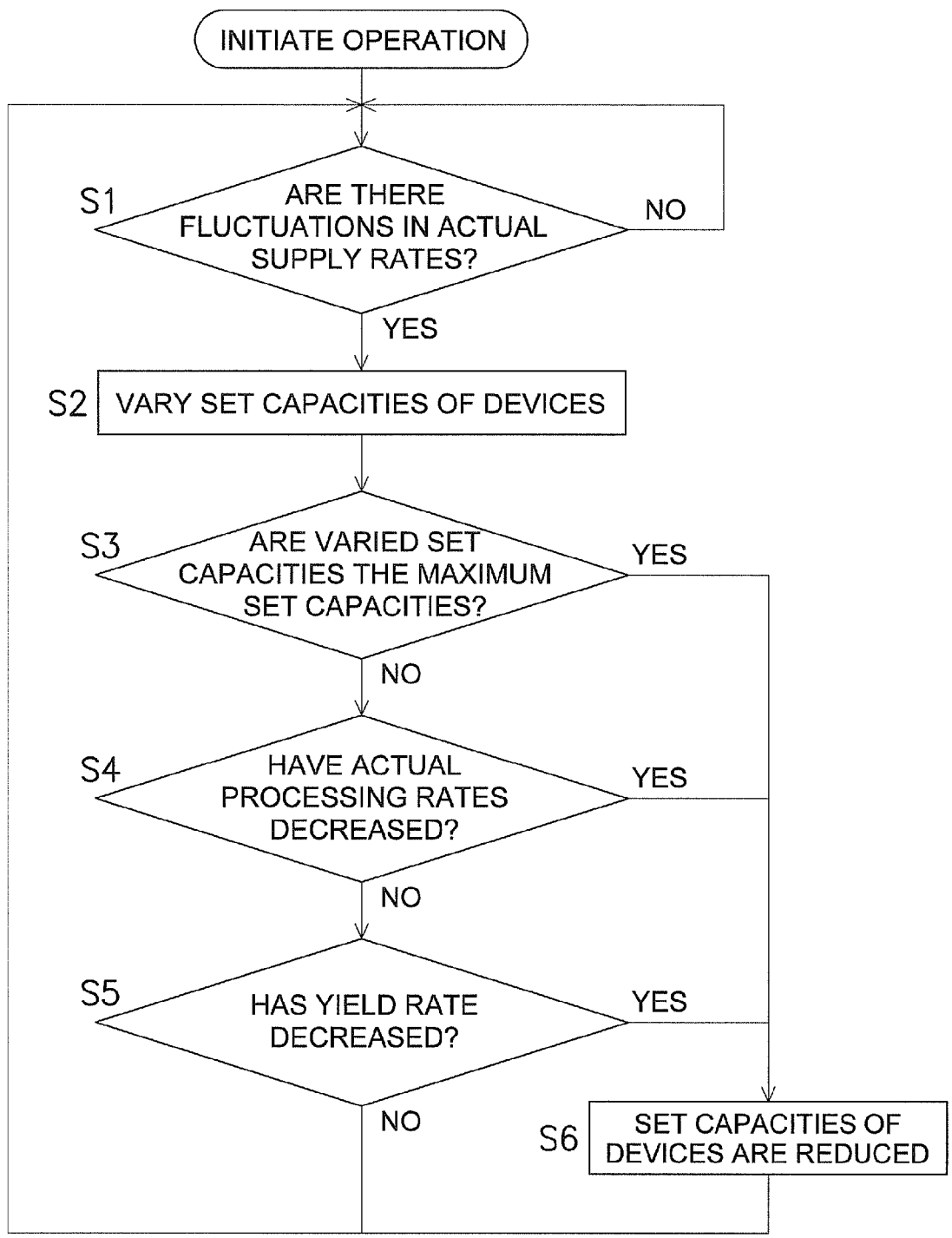
FIG. 5 is a flowchart showing the control in the variation of the set capacities in the production system in FIG. 1.

Described below with reference to FIG. 5 is a process flow in which the set capacities of devices 1 through 8 are controllably varied by a centralized control device 10*a* for the production system 100 of the present embodiment.

Specifically, first, in step S1, a determination is made as to whether or not fluctuations have been detected in the actual supply rates of the supply device 9, and the system remains in a standby mode until fluctuations have been detected. When fluctuations in the actual supply rates have been detected, the process advances to step S2, and the set capacities of the devices 1 through 8 are changed.

Next, in step S3, a determination is made as to whether or not the changed set capacities are near the maximum set capacities (maximum values of the processing capacities) stored in the storage unit 14. If the set capacities are near the maximum set capacities, the process advances to step S6, and a control procedure is performed to reduce the set capacities of the devices 1 through 8. If the set capacities are determined to not be near the maximum set capacities, a determination is made in step S4, based on the determination results of the actual processing rate detector 16, as to whether or not a decrease in the actual processing rates have been detected after the set capacities have been changed. If the actual processing rates have decreased, the process advances to step S6, and a control procedure is performed so as to reduce the set capacities of the devices 1 through 8. If the actual processing rates have not decreased, the process advances to step S5, and, based on the determination results of the yield rate determination unit 17, a determination is made as to whether or not the yield rate has decreased after the set capacities have been changed. If the yield rate has decreased, then the process advances to step S6, and a control procedure is performed so as to reduce the set capacities of the devices 1 through 8. If the yield rate has not decreased, the process returns to step S1, and the system remains in the standby mode until a fluctuation has occurred in the actual rates of supply from the supply device 9.

When a control procedure is performed so as to reduce the set capacities of the devices 1 through 8 in step S6, the reduction can be made in specific increments, or the capacities can be reduced to the suitable necessary set capacity levels in accordance with the rate of decrease of the actual processing rates or of the yield rate.

Characteristics of Production System 100

(1) In the production system 100 of the present embodiment, the centralized control device 10a controls the set capacities of the devices 1 through 8 in the production line that includes the weighing devices 1, bagging machine 2, and other devices disposed downstream so that the set capacities are varied on the basis of the detection results of the supply rate detection sensor 9a of the supply device 9 shown in FIGS. 2 and 3, that is, on the basis of the actual rates of supply from the supply device 9 to the weighing devices 1.

It is thereby possible to construct a production system with high productivity by adopting an operation that is consistent with the rate at which weighed articles are actually fed from the supply device 9. This is different from a conventional production system in which the variation of the set capacities during operation of the devices disposed downstream is controlled based on the set capacity of the supply device.

(2) The production system 100 of the present embodiment includes weighing devices 1, bagging machines 2, metal detectors 3, and other quality inspecting devices as the constituent devices of the plurality of production lines included in the production system 100.

Highly productive operation can thereby be achieved in a production system 100 wherein the weighed articles can be weighed and packaged, and the packaged products can be inspected.

(3) In the production system 100 of the present embodiment, in addition to the variation of the set capacities being controlled based on the actual supply rates as described above, the set capacities of the devices 1 through 8 can also be varied based on the actual processing rates of the devices 1 through 8 as detection results by the actual processing rate detector 16 shown in FIG. 2.

It is thereby possible to construct an even more productive system 100 by performing a control routine with consideration to the actual processing rates of the devices 1 through 8, rather than controlling the variation of the set capacities merely according to fluctuations in the actual supply rates.

(4) In the production system 100 of the present embodiment, in addition to the variation of the set capacities being controlled as described above, the variation of the set capacities of the devices 1 through 8 is controlled so that the set capacities do not approach the maximum values of the processing capacities of the devices 1 through 8 stored in the storage unit 14 as shown in FIG. 2.

It is thereby possible to avoid operating the system at a maximum capacity at which the yield rate may decrease, and to control the variation of the set capacities of the devices 1 through 8 so that the operation progresses at a high yield rate.

(5) In the production system 100 of the present embodiment, in addition to the variation of the set capacities being controlled as described above, the variation of the set capacities of the devices 1 through 8 is controlled by a procedure in which the yield rate detected by the yield rate detection unit 17 shown in FIG. 2 is used as a reference.

It is thereby possible to prevent situations in which the devices 1 through 8 are operated at a low yield rate, and to operate the devices with consistently high productivity.

(6) When a plurality of production lines (weighing devices 1) are disposed in series in relation to a single supply device 9 in the production system 100 of the present embodiment, a control procedure is performed so as to make the actual rates of supply from the supply device 9 greater in the production lines (weighing devices 1) disposed farther downstream.

It is thereby possible to avoid instances in which weighed articles are not fed to the downstream portions of the production line and remain substantially unprocessed despite the fact that the upstream portions of the production line are operating at their maximum processing capacities. Consequently, an even more productive system 100 can be constructed.

(7) In the production system 100 of the present embodiment, the weighed articles are supplied from the supply device 9 in batches.

Thus, highly productive operation can be continued because the set capacities of the downstream devices 1 through 8 are varied based on the actual supply rates, even when there are large variations in the rates at which weighed articles are received by the supply device 9 from external sources.

Second Embodiment

A production system according to another embodiment of the present invention is described hereinbelow with reference to FIGS. 6 through 8. Components having similar functions to components described in Embodiment 1 are denoted by the same numerical symbols as Embodiment 1, and descriptions thereof are omitted.

Figure 6:
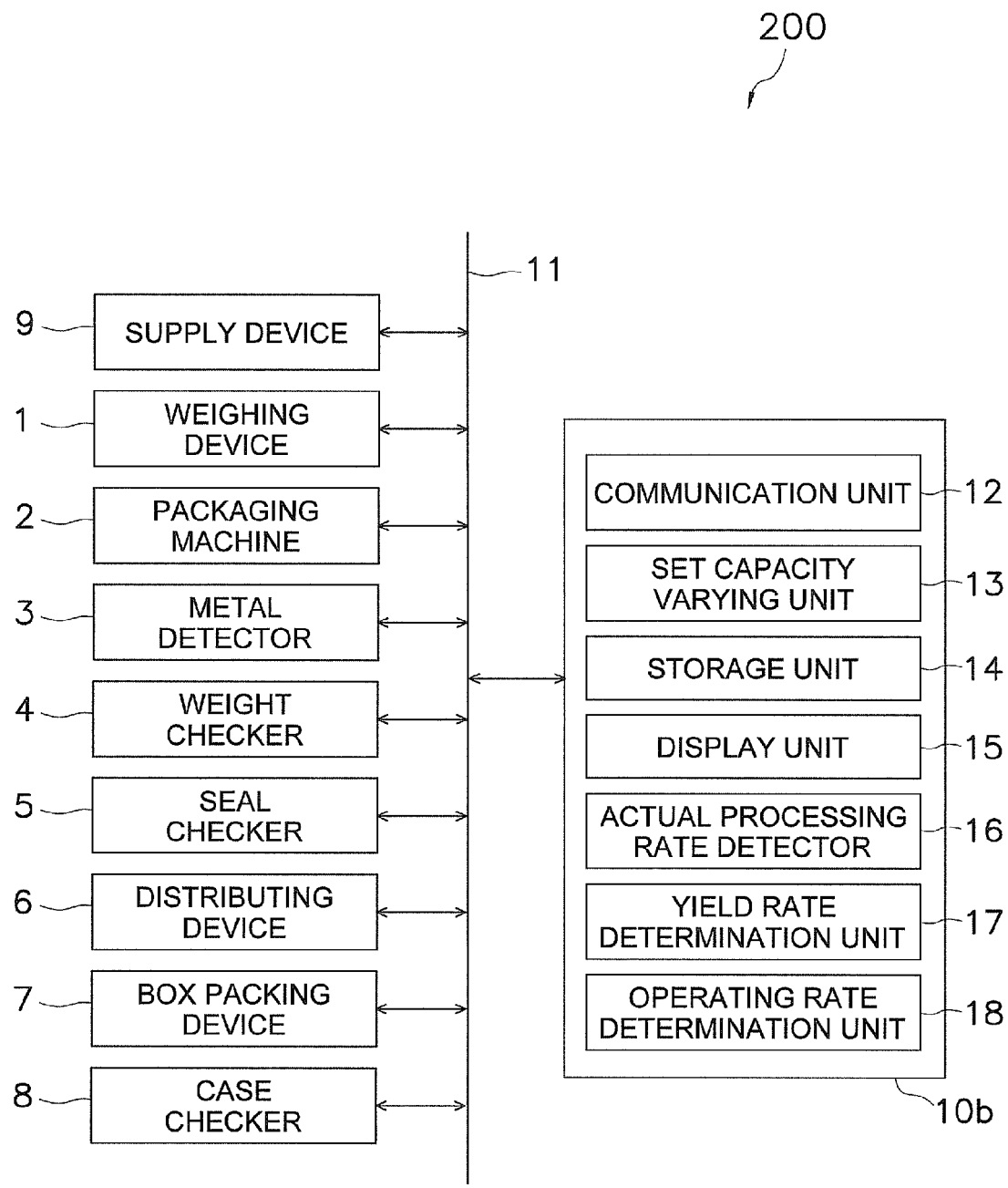
FIG. 6 is a block diagram showing the configuration of a production system according to another embodiment of the present invention.

The production system 200 of the present embodiment differs from Embodiment 1 in that the centralized control device 10b further includes an operating rate detection unit 18 as shown in FIG. 6, and the set capacities are varied so as to achieve a high-yield operation in the devices 1 through 8 on the basis of the production schedule stored in the storage unit 14 and the detection results of the operating rate detection unit 18, rather than on the basis of the detection results (actual supply rates) of the supply rate detection sensor 9a shown in FIG. 2.

The yield rate detection unit 17 calculates the yield rates of the devices 1 through 8 on the basis of the number of bags (weighed articles P) actually processed as acceptable products in the devices 1 through 8 in the production line, as described in Embodiment 1.

The operating rate detection unit 18 determines the operating rates (ratio of the current set capacities to the maximum set capacities) of the devices 1 through 8 in the production line.

Controlling Variation of Set Capacities in Production System 200

In the production system 200 of the present embodiment, the centralized control device 10b controls, based on the production schedule stored in the storage unit 14, the operating rates of the devices 1 through 8 to allow the production schedule to be completed.

Specifically, as shown in FIG. 6, the per-unit processing rates needed to complete the production schedule are calculated, and the operating rates of the devices 1 through 8 are increased or reduced based on the detection results of the operating rate detection unit 18. At this time, the detection results of the actual processing rate detector 16 and the yield rate detection unit 17 are used to vary the operating rates to prevent the operating rates from being excessively increased and the actual processing rates from being reduced rather than increased.

The devices 1 through 8 can thereby be operated at operating rates that provide the best efficiency for completing the production schedule.

Figure 7:
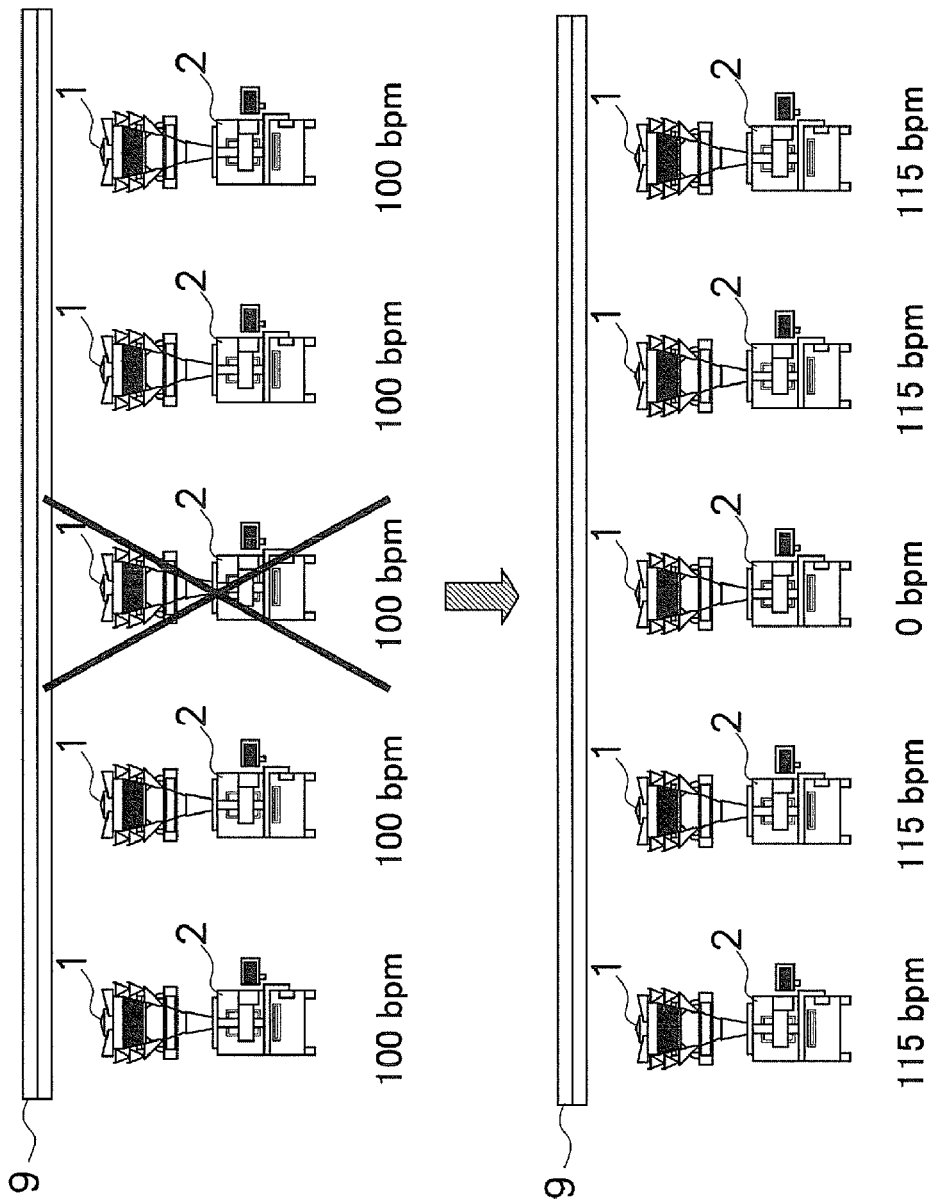
FIG. 7 is a diagram describing control when one weighing device has failed in the production system shown in FIG. 6.
Figure 8:
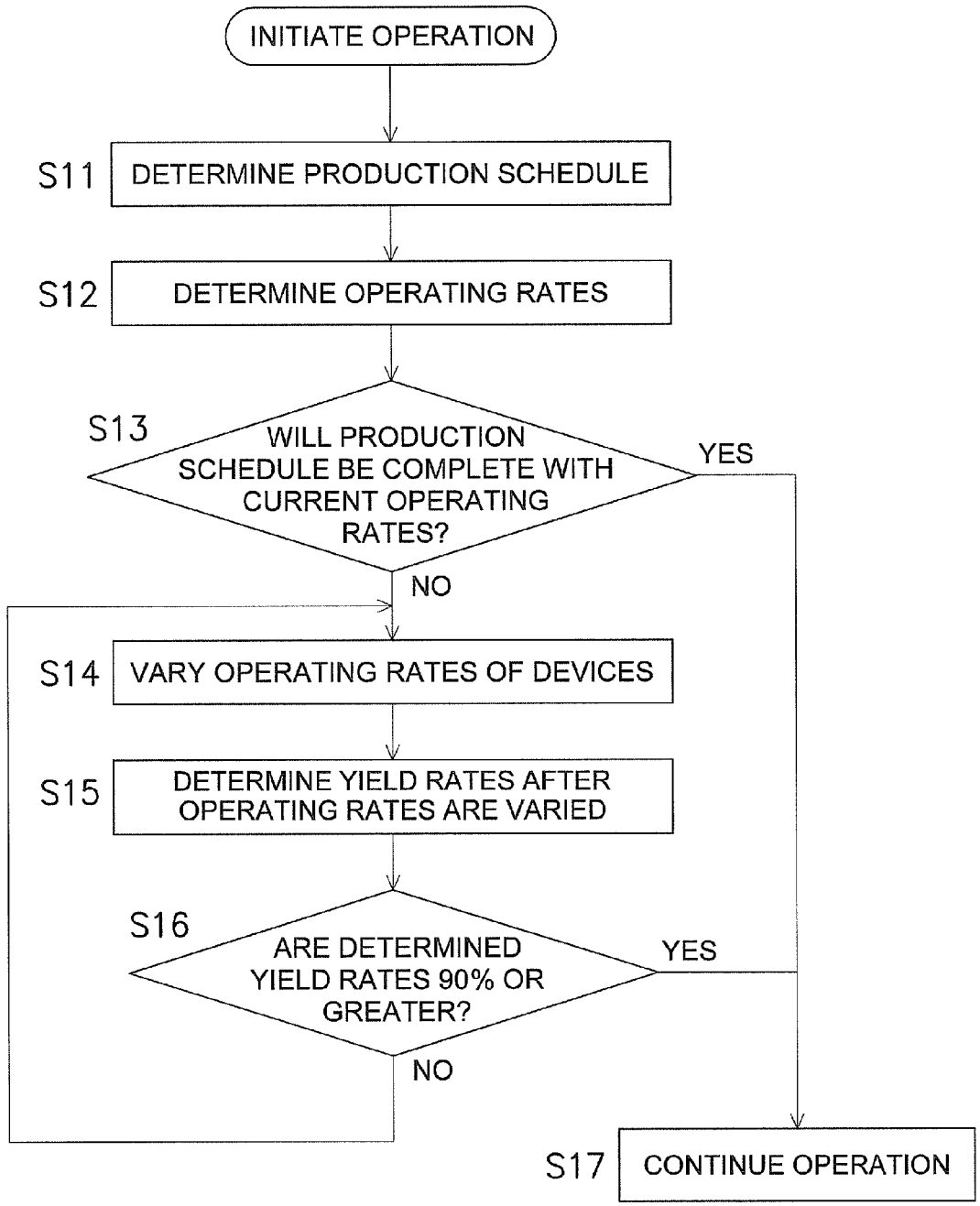
FIG. 8 is a flowchart showing the control in the variation of the set capacities in the production system in FIG. 6.

For example, when a weighing device 1 (maximum processing capacity of 130 bpm) in one of five production lines fails during operation as shown in FIG. 7, a control procedure is performed so as to increase the operating rates of the four weighing devices 1 in the other four production lines. At this time, when one weighing device 1 fails and reaches an operating rate of zero, the workload of this weighing device would, in a conventional control method, be divided among the other four weighing devices 1 to bring their set capacities to 125 bpm (operating rate of 96.2%) because the same processing rate in the other four weighing devices must be ensured. However, the maximum processing capacities of the weighing devices 1 are 130 bpm. Therefore, raising the processing capacities to 125 bpm will make the operating rate too high, causing the yield rate to decrease and the actual processing rates (rates at which acceptable products are processed) to drop.

In view of this, the production system 200 of the present embodiment is configured so that the arrangement in which the processing rate of the weighing device 1 whose operating rate has reached zero is equally redistributed so as to increase the set capacities of the other weighing devices 1, is replaced with an arrangement in which the set capacities of the other weighing devices 1 are controlled to reach 115 bpm (operating rate of 88.5%) so that productivity with the highest possible efficiency can be achieved, based on the detection results of the actual processing rate detector 16 and the yield rate detection unit 17. In other words, the operating rates are determined by the operating rate detection unit 18. As a result, a control procedure is performed so as to prevent the operating rates from exceeding a specific value (for example, 90% or greater).

It is thereby possible to construct a highly productive system, because it is possible to achieve production with the highest possible productivity on the basis of the actual processing rates, the yield rates, and the operating rates of the devices 1 through 8 so that the actual processing rates are not reduced.

The process flow in which the centralized control device 10b controls the variation of the set capacities is described hereinbelow with reference to the flowchart shown in FIG. 8.

First, in step S11, the production schedule for the production lines in the production system 200 is retrieved from the storage unit 14. Next, in step S12, the operating rate detection unit 18 of the centralized control device 10b determines the operating rates of the devices 1 through 8 on the basis of their current set capacities and processing capacities. Then, in step S13, the centralized control device 10b determines whether or not the production schedule can be completed if the devices continue to operate at their current determined operating rates. If completion of the production schedule is deemed to be possible, the process advances to step S15, and the devices continue to operate under these set conditions. If completion of the production schedule is deemed to be impossible, the operating rates of the devices 1 through 8 are controlled in step S14 so as to increase in step S14. Next, in step S15, the yield rates of the devices 1 through 8 are determined after their operating rates have increased. In step S116, if the detected yield rates are 90% or greater, the process advances to step S17, and the devices continue to operate under these set conditions. If the yield rates are less than 90%, the process returns to step S14, and the operating rates are changed again. The rest of the process is similar to the process described above.

If suitable set conditions cannot be achieved irrespective of the manner in which the operating rates are changed in the cycle including steps S14 through S16, the operating rates are controlled so that the actual processing rate as determined by the actual processing rate detector 16 increases as much as possible.

Characteristics of Production System 200

(1) In the production system 200 of the present embodiment, the centralized control device 10b determines the production plan stored in the storage unit 14 and the operating rates of the devices 1 through 8 included in the production line, and varies the set capacities of the devices 1 through 8 so as to achieve operating rates consistent with the production plan while referring to the yield rates of the devices 1 through 8.

The production plan can thereby be reliably completed because a control procedure is performed so that the set capacities of the devices 1 through 8 can reach operating rates at which the production plan can be completed.

To change an operating rate, the yield rates of the devices 1 through 8 are determined and the set capacities are controlled so that the yield rates do not fall below specific values. Therefore, rather than simply increasing the operating rates, a control procedure is performed so that the actual processing rates are not reduced even if the set capacities are increased.

As a result, it is possible to construct a highly productive system in which high-yield production can be achieved irrespective of the set capacities or operating rates.

Other Embodiments

Embodiments of the present invention were described above, but the present invention is not limited to these embodiments, and various modifications can be made within a range that does not deviate from the scope of the invention.

(A) In Embodiments 1 and 2, the weighing device 1, the bagging machine 2, the metal detector 3, the weight checker 4, the seal checker 5, the distributing device 6, the box packing device 7, and the case checker 8 shown in FIGS. 1 through 3 were described as examples of the devices constituting the production system. However, the present invention is not limited to these examples.

For example, the production system may include an X-ray scanning device as a constituent device, or may be devoid of any of the devices 1 through 8. Effects similar to those described above can still be obtained in this case.

(B) In Embodiments 1 and 2, an example was described in which the weighed articles P were supplied to a plurality of weighing devices 1 from one supply device 9, as shown in FIG. 1. However, the present invention is not limited to this example.

For example, a supply device 9 may be provided to each weighing device 1, or a supply device 9 may be provided to each group of a certain number of weighing devices 1 in the production system.

(C) In the previous embodiments, a production system 100 that included a plurality of production lines was described as an example. However, the present invention is not limited to this example.

For example, it is acceptable for the production system to include only one production line. In this case, efficient production can be achieved to reflect the operating rates or the actual processing rates of the devices 1 through 8 included in the production line.

However, as in the previous embodiments, a production system that includes a plurality of production lines is preferable because a large quantity of products can be efficiently produced.

(D) In Embodiment 2, an example was described in which a determination was made as to whether the yield rates were 90% or greater after the operating rates had been changed. However, the present invention is not limited to this example.

For example, a determination may be made as to whether the yield rates are 70% or greater following a change in the operating rates, and even lower yield rates may be set.

(E) In Embodiment 2, an example was described in which the yield rates were detected and determined by the yield rate determination unit 17 after the operating rates have been changed in accordance with the production plan. However, the present invention is not limited to this example.

For example, instead of the yield rates, the actual processing rates may be detected and determined by the actual processing rate detector 16. A production system with high productivity can still be constructed in this case.

The production system of the present invention can be widely applied to various systems that are configured so as to include various devices that perform any kind of processes on articles supplied from a supply device. This is because the effects of being able to maintain high yield rates and high operating efficiency can be achieved even when there is a lack of uniformity in the supply rates or when the operating rates of some of the constituent devices have decreased.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2005-117258. The entire disclosure of Japanese Patent Application No. 2005-117258 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A production system, comprising:
   a supply unit configured to supply articles;
   a plurality of combination weighing devices with each of the combination weighing devices being configured to perform combination weighing of the articles supplied from the supply unit to the combination weighing devices;
   a storage unit configured to store a production schedule of the articles;
   an operating rate detection unit configured to detect operating rates of the combination weighing devices, the operating rate being defined as a ratio of a current set capacity to a maximum set capacity;
   a determination section configured to determine whether the production schedule will be completed if the combination weighing devices continue to operate at the detected operating rates;
   a yield rate detection unit configured to detect yield rates of the combination weighing devices, the yield rate being defined as a ratio between a number of actual processing routines in the combination weighing device and a number of acceptable products processed by the combination weighing device; and
   a control unit that varies the operating rate of each of the combination weighing devices individually so that the yield rates detected by the yield rate detection unit do not fall below a prescribed yield rate, when the determination section determines the production schedule will not be completed.

2. The production system according to claim 1, wherein the articles are supplied to the supply unit in batches.

3. The production system according to claim 1, wherein the control unit is configured to vary the set capacities of the combination weighing devices to change processing capacities indicative of numbers of units of articles to be processed over a prescribed time period in the combination weighing devices.

4. The production system according to claim 1, wherein the control unit is configured to change the operating rates of the combination weighing devices so that the yield rates in the production system are not reduced upon detecting that at least one of the yield rates is lower than the prescribed yield rate.

5. The production system according to claim 1, wherein the control unit is configured to change the operating rates of the combination weighing devices so that the operating rates of the combination weighing devices do not exceed a prescribed operating rate.

6. The production system according to claim 1, wherein the control unit is configured to vary the operating rates of the combination weighing devices so that the actual processing rate in the combination weighing devices is not reduced.

7. The production system according to claim 1, wherein the control unit is configured to vary the operating rates so that the set capacities of the combination weighing devices do not reach a maximum.

8. The production system according to claim 1, wherein the control unit is configured to reduce the set capacities of the combination weighing devices to vary the operating rates so as to achieve the high yield rate in the production system during operation.

* * * * *